(12) United States Patent
Fu et al.

(10) Patent No.: US 8,804,325 B2
(45) Date of Patent: Aug. 12, 2014

(54) FASTENING DEVICE FOR DATA STORAGE DEVICE

(75) Inventors: Li-Ren Fu, Shenzhen (CN); An-Gang Liang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 150 days.

(21) Appl. No.: 13/441,012

(22) Filed: Apr. 6, 2012

(65) Prior Publication Data

US 2013/0163180 A1 Jun. 27, 2013

(30) Foreign Application Priority Data

Dec. 21, 2011 (CN) .......................... 2011 1 0432351

(51) Int. Cl.
*G06F 1/16* (2006.01)
(52) U.S. Cl.
USPC ........................................ 361/679.33; 211/26
(58) Field of Classification Search
USPC ........................................ 361/679.33; 211/26
See application file for complete search history.

(56) References Cited

U.S. PATENT DOCUMENTS

| | | | | |
|---|---|---|---|---|
| 6,532,150 B2* | 3/2003 | Sivertsen et al. | ........ | 361/679.33 |
| 7,054,153 B2* | 5/2006 | Lewis et al. | ............ | 361/679.33 |
| 7,355,846 B1* | 4/2008 | Chen et al. | ............ | 361/679.33 |
| 7,403,381 B2* | 7/2008 | Chen et al. | ............ | 361/679.33 |
| 7,440,272 B2* | 10/2008 | Chen et al. | ............ | 361/679.33 |
| 7,542,278 B2* | 6/2009 | Liu et al. | ................... | 361/679.33 |
| 7,571,884 B2* | 8/2009 | Chen et al. | ............... | 248/291.1 |
| 7,916,464 B2* | 3/2011 | Chen | ........................ | 361/679.33 |
| 8,059,395 B2* | 11/2011 | Zhang et al. | ............. | 361/679.33 |
| 8,085,530 B2* | 12/2011 | Zhang et al. | ............. | 361/679.33 |
| 8,570,733 B2* | 10/2013 | Long et al. | ............... | 361/679.33 |
| 8,582,300 B2* | 11/2013 | Liang et al. | .................... | 361/724 |
| 2008/0316698 A1* | 12/2008 | Yeh et al. | ...................... | 361/685 |
| 2013/0105422 A1* | 5/2013 | Zhou | ............................... | 211/26 |

* cited by examiner

*Primary Examiner* — Lisa Lea Edmonds
(74) *Attorney, Agent, or Firm* — Novak Druce Connolly Bove + Quigg LLP

(57) ABSTRACT

A fastening device for fastening a data storage device includes a rack and a resilient tab. The rack includes a bottom plate to support the data storage device. Two first stop tabs protrude up from the bottom plate to abut against a first sidewall of the data storage device. Two first pins extend from the first corresponding stop tabs to engage in two mounting holes defined in the first sidewall. The resilient tab is attached to the rack to abut against a second sidewall of the data storage device. A second pin protrudes from the resilient tab to engage in a locking hole defined in the second sidewall.

6 Claims, 6 Drawing Sheets

FASTENING DEVICE FOR DATA STORAGE DEVICE

BACKGROUND

1. Technical Field

The present disclosure relates to a device for fastening a data storage device.

2. Description of Related Art

An electronic device, such as a computer, may be equipped with data storage devices, such as an optical disk drive. Mounting the optical disk drive to the electronic device with screws is inefficient and requires the use of a tool, such as a screwdriver, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
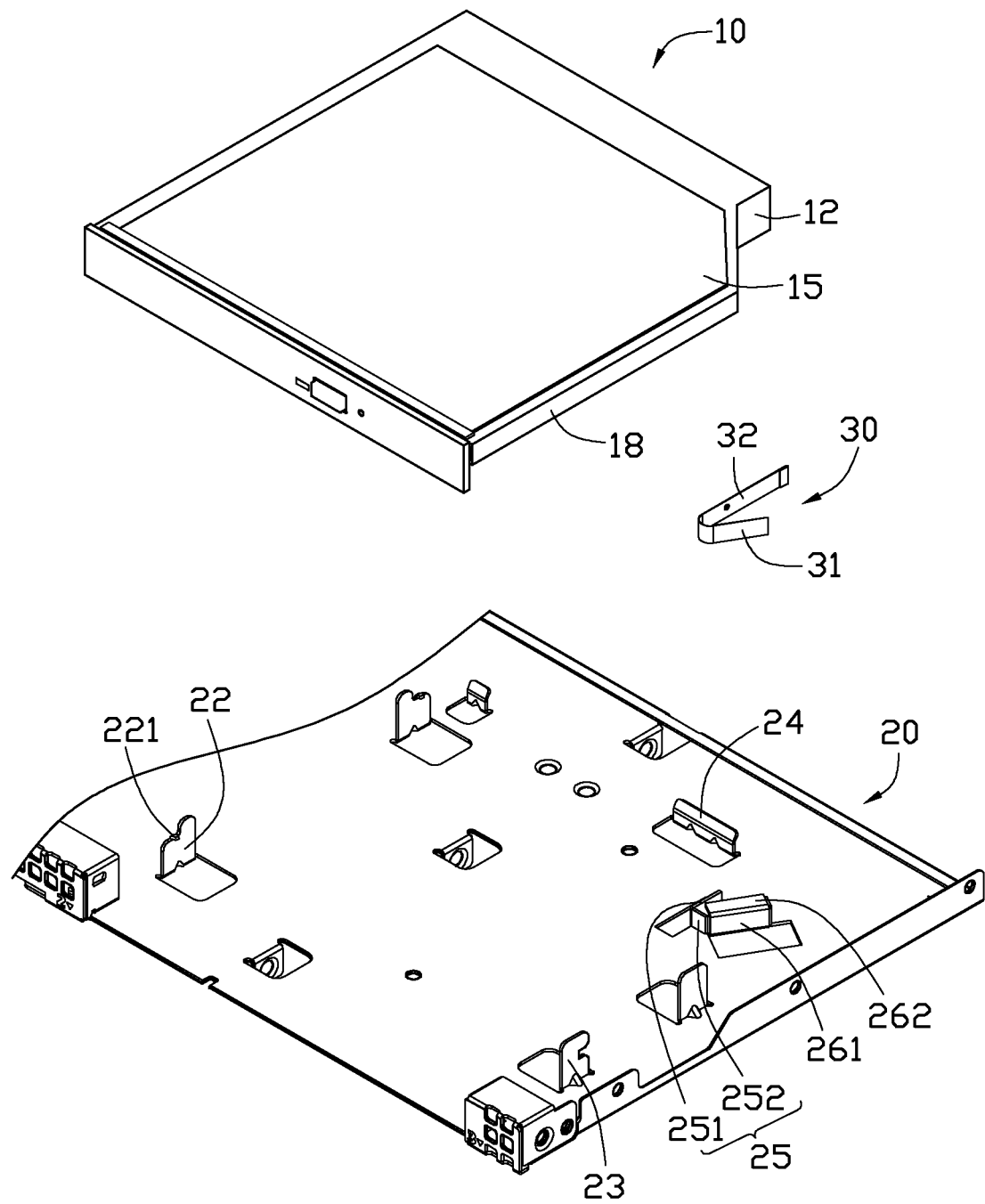
FIG. 1 is an exploded, isometric view of an exemplary embodiment of a fastening device, together with an optical disk drive (ODD).

FIG. 1 shows an exemplary embodiment of a fastening device for fastening a data storage device, such as an optical disk drive (ODD) 10. The fastening device includes a rack 20 and a resilient tab 30.

Figure 2:
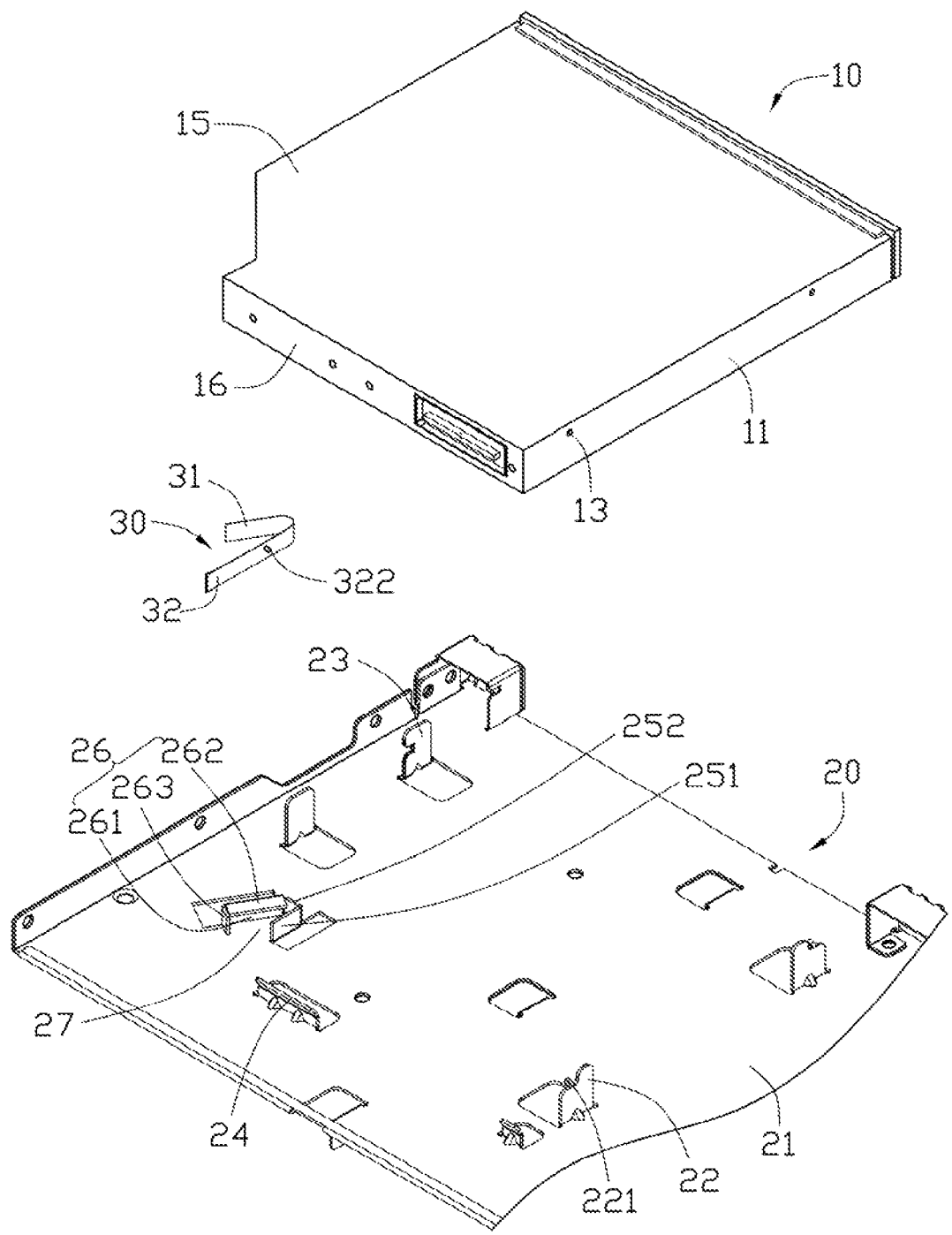
FIG. 2 is similar to FIG. 1, but viewed from a different perspective.
Figure 3:
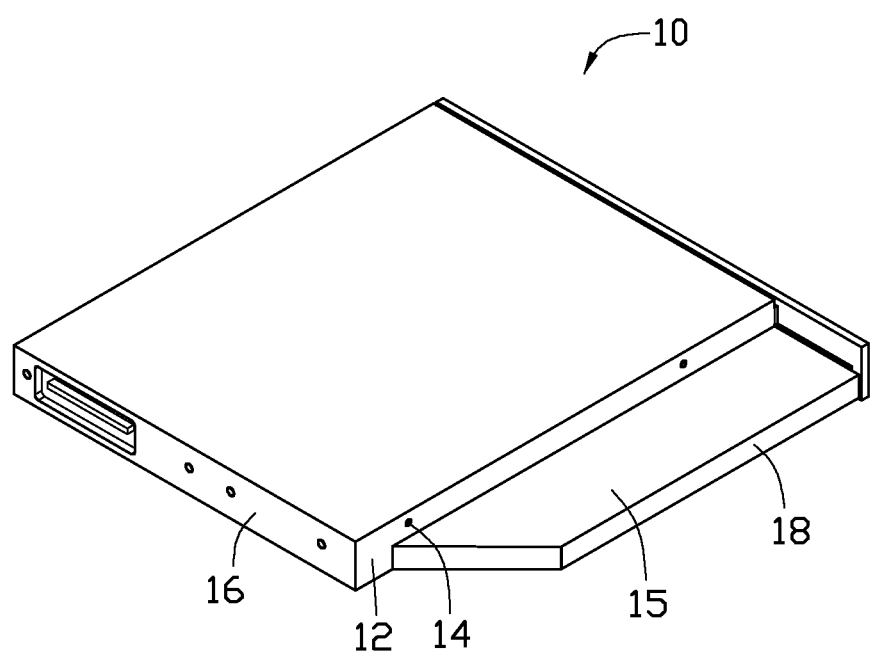
FIG. 3 is an inverted view of the ODD of FIG. 1.

FIGS. 2 and 3 show the ODD 10 including a first sidewall 11, a second sidewall 12 opposite to the first sidewall 11, and a rear sidewall 16 connected between rear ends of the first sidewall 11 and the second sidewall 12. Two spaced mounting holes 13 are defined in the first sidewall 11. An abutting plate 15 perpendicularly extends from an upper portion of the second sidewall 12. A locking hole 14 is defined in the second sidewall 12, below the abutting plate 15. The abutting plate 15 includes a third sidewall 18 parallel to and away from the second sidewall 12.

FIGS. 1 and 2 show the rack 20 including a bottom plate 21. Two first stop tabs 22 protrude up from the bottom plate 21, in alignment with each other. Two second stop tabs 23 protrude up from the bottom plate 21, opposite to the first stop tabs 22. A third stop tab 24 substantially perpendicular to the first stop tabs 22 protrudes up from the bottom plate 21, between the first stop tabs 22 and the second stop tabs 23. A pin 221 protrudes from each first stop tab 22 toward the second stop tabs 23. An L-shaped abutting portion 25 protrudes up from the bottom plate 21, between the second stop tabs 23 and the third stop tab 24. The abutting portion 25 includes an abutting tab 251 perpendicular to the third stop tab 24, and a tab 252 perpendicularly extending toward the second stop tabs 23 from a front end of the abutting tab 251. A receiving portion 26 protrudes up from the bottom plate 21, adjacent to the abutting portion 25. The receiving portion 26 includes a sidewall 261 adjacent to the tab 252 and slantingly extending backward away from the abutting tab 251, a top wall 262 perpendicularly extending from a top side of the sidewall 261 toward the abutting tab 251, and an end wall 263 perpendicularly extending from a rear end of the sidewall 261 toward the abutting tab 251. The abutting portion 25 and the receiving portion 26 bound a receiving space 27.

Figure 6:
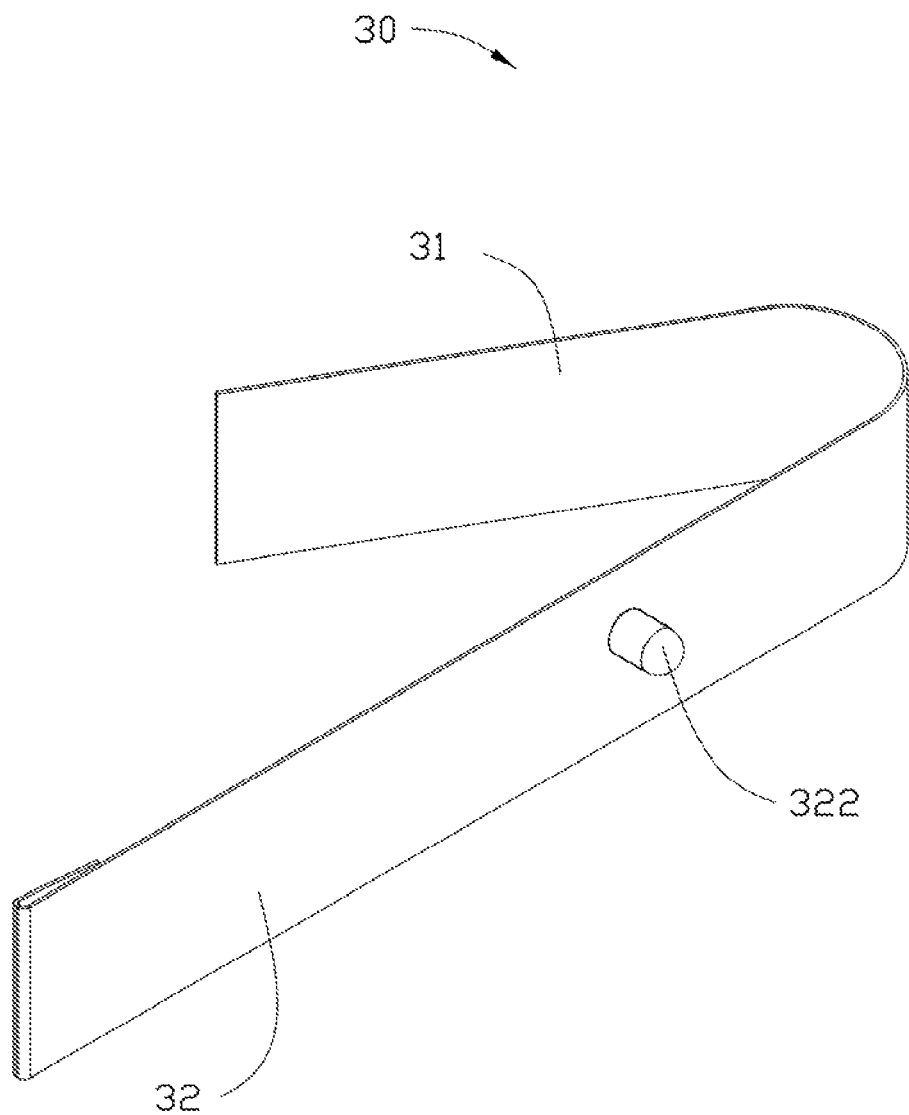
FIG. 6 is an enlarged view of the resilient tab of FIG. 2.

FIG. 6 shows that the resilient tab 30 is substantially V-shaped, including an operation portion 32 and a contacting portion 31 slantingly rearward extending from a front end of the operation portion 32. A pin 322 protrudes from a side of the operation portion 32 opposite to the contacting portion 31. A distal end of the pin 322 is arc-shaped.

Figure 4:
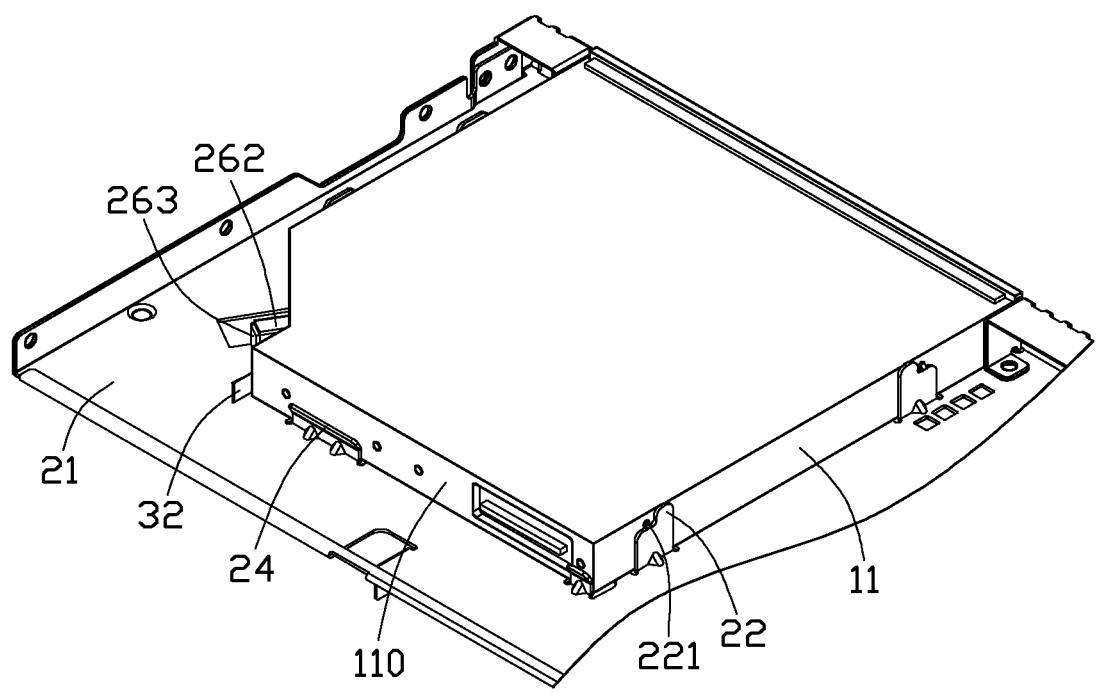
FIG. 4 is an assembled, isometric view of FIG. 2.
Figure 5:
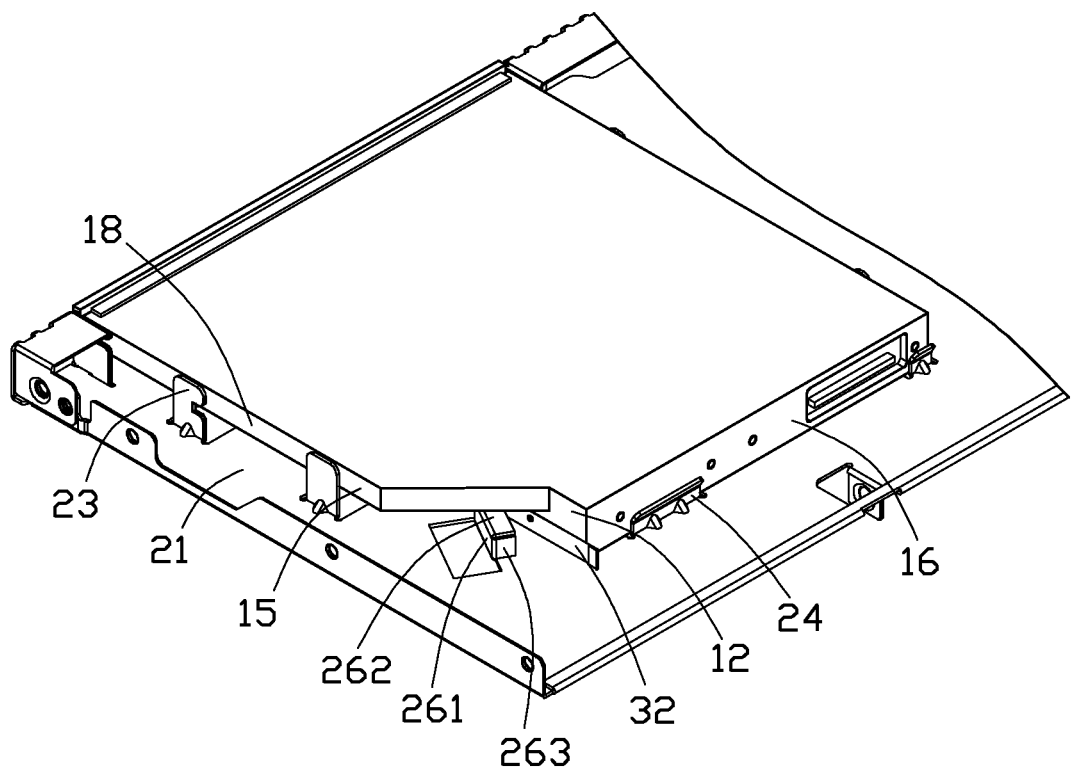
FIG. 5 is similar to FIG. 4, but viewed from a different perspective.

FIGS. 4 and 5 show in assembly, the operation portion 32 and the contacting portion 31 are manipulated to be deformed toward each other. The resilient tab 30 is received in the receiving space 27, and the contacting portion 31 abuts against inner surfaces of the sidewall 261, top wall 262, and end wall 263, a front part of the operation portion 32 adjacent to the contacting portion 31 abuts against an inner surface of the abutting tab 251, a rear part of the operation portion 32 away from the contacting portion 31 extends out of the receiving space 27. Therefore, the resilient tab 30 is mounted to the rack 20.

To fasten the ODD 10, a first part of the bottom wall of the ODD 10 adjacent to the first sidewall 11 is placed on the bottom plate 21, with the ODD 10 located between the first stop tabs 22 and the second stop tabs 23. The pins 221 engage in the corresponding mounting holes 13. The ODD 10 is manipulated down, the first sidewall 11 abuts against the first stop tabs 22, and a second part of the bottom wall of the ODD 10 adjacent to the second sidewall 12 abuts against the distal end of the pin 322. The operation portion 32 is deformed to make the pin 322 abut against the second sidewall 12. When the bottom wall of the ODD 10 completely abuts against the bottom wall 21, the pin 322 aligns with the locking hole 14. The operation portion 32 is restored, to allow the pin 322 to engage in the locking hole 14. The second sidewall 12 abuts against the abutting tab 251, the third sidewall 18 abuts against the second stop tabs 23, and the rear sidewall 16 abuts against the third stop tab 24. Therefore, the ODD 10 is fastened to the rack 20.

To detach the ODD 10, the operation portion 32 is deformed away from the ODD 10, to allow the pin 322 to disengage from the locking hole 14. The ODD 10 is manipulated up, to disengage the pins 221 from the corresponding mounting holes 13. Therefore, the ODD 10 is disassembled from the rack 20.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A fastening device for fastening a data storage device, comprising:
   a rack comprising a bottom plate to support the data storage device, and two first stop tabs protruding up from the bottom plate to abut against a first sidewall of the data storage device, two first pins extending from the corresponding first stop tabs to engage in two mounting holes defined in the first sidewall; and a resilient tab attached to the rack to resiliently abut against a second sidewall of the data storage device opposite to the first sidewall, a second pin protruding from the resilient tab to engage in a locking hole defined in the second sidewall;

wherein the rack comprises an abutting portion and a receiving portion protruding up from the bottom plate, the resilient tab is partially received in a receiving space bounded by the abutting portion and the receiving portion, the abutting portion comprises an abutting tab abutting against the second sidewall.

2. The fastening device of claim 1, wherein the resilient tab is substantially V-shaped, and comprises an operation portion and a contacting portion extending from an end of the operation portion, the contacting portion abuts against an inner surface of the receiving portion, a first part of the operation portion adjacent to the contacting portion abuts against an inner surface of the abutting tab, and a second part of the operation portion away from the contacting portion extends out of the receiving space, the second pin protrudes from the operation portion.

3. The fastening device of claim 2, wherein the abutting portion further comprises a tab extending from a front end of the abutting tab away from the first stop tabs, the receiving portion comprises a sidewall adjacent to the tab and slantingly extending backward away from the abutting tab, a top wall extending from a top of the sidewall toward the abutting tab, and an end wall extending from a rear end of the sidewall toward the abutting tab, the contacting portion abuts against inner surfaces of the sidewall, the end wall, and the top wall.

4. The fastening device of claim 1, wherein a second stop tab protrudes up from the bottom plate to abut against an abutting plate extending from the second sidewall.

5. The fastening device of claim 1, wherein a third stop tab protrudes up from the bottom plate to abut against a rear side of the data storage device.

6. The fastening device of claim 1, wherein a distal end of the second pin is arc-shaped.

* * * * *